United States Patent [19]

Yanikoshi

[11] 3,734,254
[45] May 22, 1973

[54] STEPPING MOTOR WITH AUTOMATIC BRAKE

[75] Inventor: Florian F. Yanikoshi, Braintree, Mass.

[73] Assignee: Sigma Instruments, Inc., South Braintree, Mass.

[22] Filed: Dec. 10, 1971

[21] Appl. No.: 206,626

[52] U.S. Cl.......................192/16, 192/8 R, 318/372
[51] Int. Cl.............................B60t 7/12, F16d 67/02
[58] Field of Search.....................192/7, 8, 15, 12 B, 192/16

[56] References Cited

UNITED STATES PATENTS

| | | | |
|---|---|---|---|
| 3,176,539 | 4/1965 | Mersereau | 192/15 |
| 2,954,107 | 9/1960 | Klasing | 192/16 |
| 2,770,339 | 11/1956 | Dotson | 192/16 |
| 1,238,466 | 8/1917 | Watson | 192/16 |
| 774,850 | 11/1904 | Mayer | 192/16 |
| 1,628,212 | 5/1927 | Wintever | 192/16 X |
| 2,424,910 | 7/1947 | Benson | 192/16 X |

Primary Examiner—Benjamin W. Wyche
Attorney—James E. Mrose et al.

[57] ABSTRACT

A motorized drive which will reliably turn a loaded output shaft in one direction and mechanically brake the shaft against all but intended reverse rotations includes an electromagnetic stepping motor having a threaded armature shaft carrying a pair of clutch discs, one of which is geared with the output shaft and is threadedly separable from and unitable with the other on the armature shaft, and a one-way brake of the overrunning clutch type which unidirectionally holds the other brake disc in relation to the motor stator or frame structure.

1 Claim, 5 Drawing Figures

Patented May 22, 1973
3,734,254
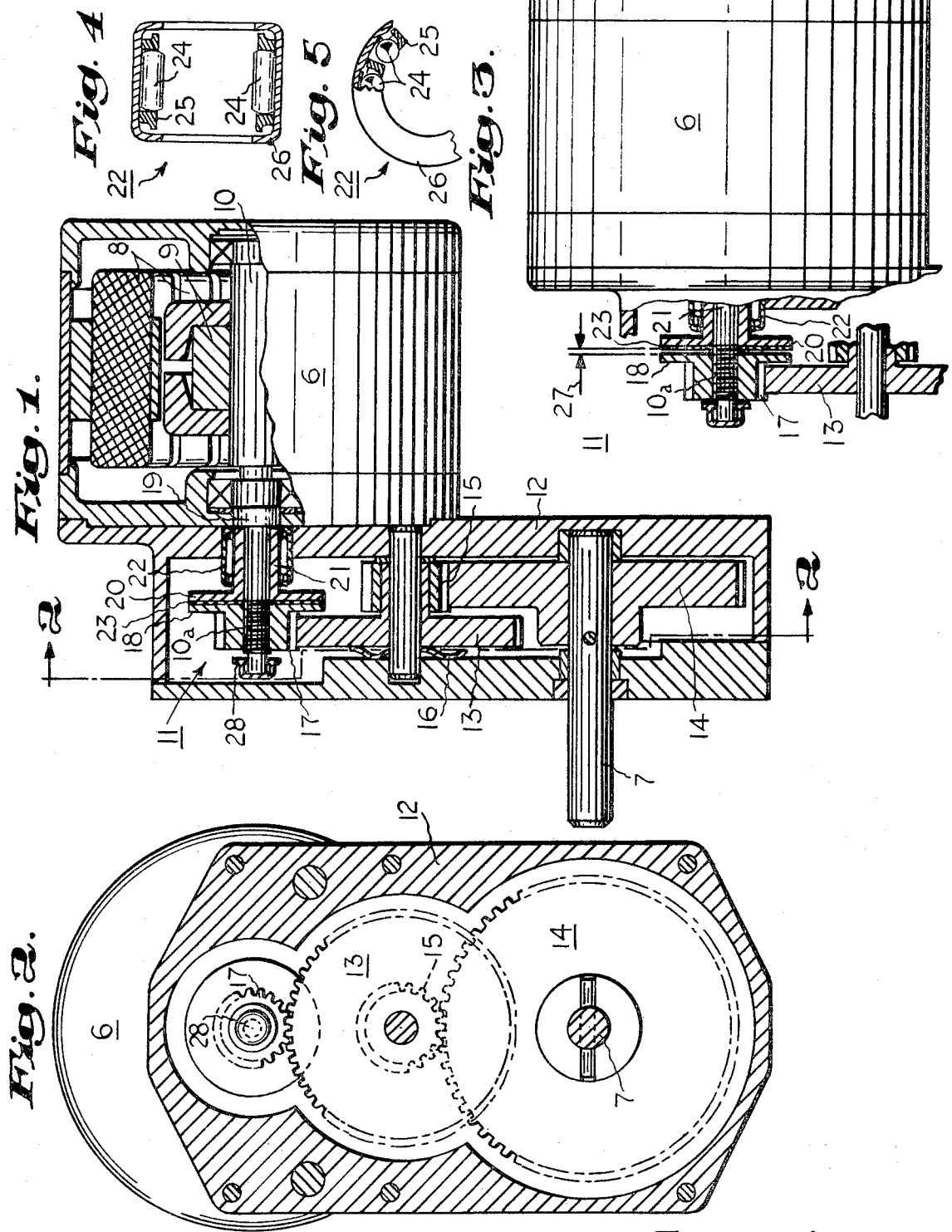

STEPPING MOTOR WITH AUTOMATIC BRAKE

BACKGROUND OF THE INVENTION

For certain types of powered drives, such as those which operate "elevator" devices designed to controllably lift, hold, and lower a load, it is highly desirable that the holding function be performed and sustained reliably, despite possible weakness of drive-motor torque during stalled or inoperative conditions of the motor. At the same time, the reverse direction of movement, against the locking or holding action, should nevertheless be achievable readily and automatically when the motor is excited for that sense of movement. These operating characteristics are preferably to be realized by way of uncomplicated mechanisms of small size and low manufacturing cost. So-called "stepping" motors possess capabilities of being rapidly indexed by precise angular amounts in either angular direction in response to appropriate electrical excitations, and are therefore generally attractive as motive sources for drives such as those under discussion. However, the holding effect of electromagnetic poles of such motors may not suffice to provide needed secure restraint under severe maximum loading conditions, and compact, automatic, and positive-locking output coupling mechanisms are required to render such motors useful in applications involving these conditions.

SUMMARY

The present invention is aimed at creating novel and useful motorized drive and brake mechanisms incorporating automatic holding provisions, and, in one particular aspect, to a unique electrical stepping-motor coupling, for the lifting, automatic holding, and lowering of an elevator-type load, which is of inexpensive, reliable, efficient and miniaturized construction involving a simple combination of a threaded shaft, clutch discs and a unidirectional brake.

By way of a summary account of practice of this invention in one of its aspects, a conventional form of electromagnetic stepping motor has the outer tip of its armature shaft threaded externally, the latter being mated to have a relatively free non-locking fit with an internally-threaded pinion slidably meshed with a load gear in driving and driven relationship with a load shaft which is to be turned in one direction, or to be held against turning in the opposite direction, or to be allowed to turn in the said opposite direction. Associated with the pinion is a first annular clutch disc, which may be axially positioned by actions of the aforesaid threading to be engaged with and disengaged from a second annular clutch disc sleeve-mounted on the same armature shaft. Between the second clutch-disc sleeving and a framework fixed relative to the motor stator structure is a brake of the unidirectional overrunning clutch type, preferably of a locking-roller type, which allows relative rotation of its inner and outer portions in but one angular sense.

Upon being appropriately excited electrically, the motor rotates its armature shaft in an angular direction accommodated by the one-way clutch, whereupon, against the yieldable restraint of the load gear, the first clutch disc is threadedly wound until it engages the second, the two then assuming an angularly-locked relation to the armature shaft because of a resulting jamming action. Continued rotation in the same direction powers the load through the load gear. When excitation or motor rotation then ceases, reflected loading through the gear, pinion, and clutch discs causes the one-way brake to be urged in the locking sense, whereupon all rotation is halted automatically and the load is held. If the load is to be allowed to turn the load gear in the reverse direction, the motor is energized to turn in a direction opposite to that last considered, and the first clutch disc unwinds sufficiently to permit it and the armature shaft to turn, with the result that a close and limited follow-up reversal in turning action of the load gear ensues.

BRIEF DESCRIPTION OF THE DRAWING

FIG. 1 is a partly cut-away and cross-sectional side elevational view of an improved combination of a stepping motor and brake and drive mechanism in accordance with this invention;

FIG. 2 is a cross-section of the same combination taken along section line 2—2 in FIG. 1;

FIG. 3 provides a fragmentary detail of a portion of the combination shown in FIG. 1, with the clutch discs parted;

FIG. 4 illustrates a transversely-cross-sectioned one-way brake such as is useful in the embodiment of FIGS. 1–3; and FIG. 5 is a partly cross-sectioned end view of a portion of the one-way brake appearing in FIG. 4.

DESCRIPTION OF THE PREFERRED EMBODIMENTS

The assembly depicted in FIGS. 1–3 includes an electrical drive motor 6 which is intended to rotate an output shaft 7 associated with a rotational load, such as that of an elevator device designed for lifting, holding and lowering a loaded platform (not shown). As illustrated, the motor 6 is in the form of a conventional stepping motor, the stator windings 8 of which may be energized in known fashion to cause the usual internally-toothed stator poles to establish electromagnetic interactions with externally-toothed elements of the permanently-magnetized rotor or armature 9 and thereby rotate the armature shaft 10 in one or the opposite angular directions. Motors of this type characteristically exhibit a detent tendency, wherein the rotor tends to lock or hold in predetermined angular relationships with the stator unless electrically powered into movements; however, that tendency is not always dependable for the reliable restraint of rotational loads imposed on the armature shaft, and an associated automatic clutch and brake mechanism is therefore provided in accordance with the present teachings, to hold severe loads securely whether or not electrical power is available.

For the latter purposes, a clutch mechanism designated generally by reference character 11 is interposed between the armature shaft 10 and the gearing through which it is coupled with the unit output shaft 7. Conveniently, that mechanism is housed within the gear-box structure 12 fixed with the stator or framework of the motor and including a train gear sequence of a load gear 13 driving the output-shaft gear 14 through an intermediate gear 15. A spring element 16 can take up certain tolerances, if desired. Armature shaft 10 is externally threaded at an outwardly-projecting end 10a thereof, to implement the actions of the clutching mechanism, and, in that connection, the threading is selected so that it will have relatively free fit. Mated with the threaded end of the armature shaft is a pinion 17 having complementary internal threading, as well as an integral annular clutch disc 18 facing toward the armature. Between the said clutch disc and an enlarged shoulder 19 on armature shaft is a further annular clutch disc 20, united with and carried by a tubular sleeve element 21 which is relatively rotatable in relation to the supporting shaft. In turn, an annular one-way rotatable brake unit 22 is disposed between the exterior of sleeve element 21 and the framework 12 fixed with the motor stator structure.

One or both of the confronting surfaces of annular clutch discs 18 and 20 may be suitably coated or surfaced, as designated via reference character 23, to insure that good angular coupling is achieved between them upon engagement but that they may be readily parted or separated from one another in the axial direction. Somewhat similarly, the confronting end surfaces of shaft shoulder 19 and sleeve 21 are intended to jam together under certain operating conditions but to release readily in angular coupling under other conditions.

As is shown in FIGS. 4 and 5, the one-way rotatable brake unit 22 may conveniently comprise a relatively thin annular assembly such as is available under the descriptive designation as an overrunning clutch, from The Torrington Co. Typically, the unit includes an array of rollers, 24, held by a shaped guide-and-spacer retainer 25 in an outer raceway 26 which has sloped inner peripheral wall surfaces. When the rollers are turned in one direction about their longitudinal axes, by a cooperating inner shaft which in the case under discussion is the tubular sleeve 21, they simply rotate relatively freely in accommodating radial spaces afforded by the shaping of the inner peripheral wall surfaces of raceway 26. Retainer 25 has shaped surfaces which tend to lift the rollers radially into these spaces and prevent unwanted jamming. However, turning of the rollers in the opposite directions about their axes has the desired effect of jamming them between the inner shaft, or sleeve 21, and the radially innermore portions of the inner periphery of raceway 26, whereupon the sleeve and outer raceway tend to lock together angularly almost at once.

The axial spacing 27 between clutch discs 18 and 20 in FIG. 3 is displayed to aid in an understanding of the action wherein no braking is effective, although it should be understood that the spacing tends to be minute and short-lived in practice. If it is assumed that such spacing exists initially, and that the motor 6 is excited to drive its armature shaft 10 in an intended forward or load-powering angular direction, the angularly-restrained internally-threaded pinion 17 will advance axially toward the motor armature under influence of the cooperating external threading 10a on the armature shaft. During this winding-up action, the pinion slides axially in relation to the enmeshed load gear 13 until the associated clutch disc 18 engages clutch disc 20. The latter can move axially inward only until the small end surface of the associated sleeve 21 firmly abuts the shaft shoulder 19, whereupon the discs are necessarily locked angularly together and with the armature shaft 10. Accordingly, the armature shaft drives pinion 17 in its same angular direction, with consequent related powering of the output shaft 7 via gears 13, 14 and 15. At such times, the brake unit 22 offers substantially no resistance to the turning of sleeve 21 and motor shaft 10.

Upon cessation of motive powering in the sense last discussed, any loading torque reflected back in the opposite sense from output shaft 7 via gears 13–15 to pinion 17 will immediately develop an automatic angular locking and hold of the load, whether the motor is energized or not. Such reflected reverse torque is typical of what is experienced when the device is used to lift a load after the fashion of an elevator, crane hoist or the like. The holding action occurs as pinion 17 attempts to force clutch discs in the reversed angular direction, whereupon sleeve 21 develops the aforementioned locking with the framework 12 by way of the brake unit 22, which is then jammed by being torqued in the wrong direction.

Release of the locking, and attendant reversed-direction motion of output shaft 7 may nevertheless occur, controllably, as the motor 6 itself intentionally energized to rotate in the reverse direction, such as is the case where an elevated load is to be lowered. Upon occurrence of each increment of angular movement of the armature shaft 10 in the reversed direction, the one-way brake 22 continues to hold or lock, but shaft 10 may nonetheless turn within the sleeve 21 and thereby slightly unwind the threaded pinion from the threaded end of the shaft; this is accompanied by slight axial separation of the clutch discs and by immediate turning of the pinion in the desired reversed direction, as induced by the reflected loading, until the clutch discs again lock. In this fashion, a close follow-up action occurs as the motor steps or turns in the reversed direction, and an elevated or hoisted load may be lowered with precise control and with assurance that holding action will develop automatically if reversed-direction movement is not intended. A cap or stop nut 28 on the end of armature shaft 10 insures that the pinion cannot be unwound excessively in unusual or tampered handling of the device.

Shoulder 19 on the shaft 10 is, broadly speaking, a positioning stop, and may assume forms other than specifically a shoulder, to achieve the required locking effects in cooperation with a surface of the appropriate one of the brake disc portions.

What I claim as new and desire to secure by Letters Patent of the United States is:

1. A brake and drive apparatus for the powered movement and automatic holding of a load, comprising an electrical stepping motor of the type including an electrically-excited internally-toothed stator concentric with and developing detent locking relationships with an externally-toothed permanently-magnetized armature in a motor framework, said motor having a drive shaft angularly movable with the armature thereof and supported wholly by bearings in said motor framework, said drive shaft having an externally-threaded portion of an extension thereof outwardly beyond said motor framework in axially-spaced relation to a positioning stop fixed axially in relation to said shaft, first and second substantially annular clutch members disposed about said shaft extension and having substantially annular clutching surfaces in confronting relation to one another, said first clutch member being internally threaded and in threaded engagement with said externally-threaded portion of said shaft extension and thereby forming a motion-transposing coupling for movements of said first member into and out of engagement with said second member responsive to shaft movements in one and the opposite angular directions, said second clutch member having an annular sleeve portion about said shaft with an end surface of said sleeve portion in confronting relation to said stop to form a locking arrangement whereby turning of said shaft in said one direction winds said first member on said shaft and urges said clutching surfaces together and urges said end surface into engagement with said stop to lock said first member for angular movement in said one direction with said shaft, means connecting said first member in driving and driven relation to a load comprising a pinion integral with and angularly movable with said first member and a load gear meshed with said pinion, said pinion being axially slidable in relation to said load gear upon winding of said first member on said drive shaft, and one-way brake means comprising an annular overrunning clutch including an array of rollers about said sleeve portion and substantially parallel therewith and disposed within a surrounding raceway having sloped inner wall surfaces, said raceway being fixed in relation to said framework, said brake means accommodating angular motion of said sleeve portion and said second clutch member substantially in said one direction only, whereby said one-way brake means holds said first clutch member and said pinion against movement in said opposite direction except when said drive shaft is powered to turn angularly in said opposite direction by said stepping motor.

* * * * *